(12) United States Patent
Hicks

(10) Patent No.: US 7,396,064 B2
(45) Date of Patent: Jul. 8, 2008

(54) VEHICLE RAMP ROOM

(75) Inventor: Michael Hicks, El Paso, TX (US)

(73) Assignee: Dometic Corporation, Elkhart, IN (US)

( * ) Notice: Subject to any disclaimer, the term of this patent is extended or adjusted under 35 U.S.C. 154(b) by 401 days.

(21) Appl. No.: 11/287,968

(22) Filed: Nov. 28, 2005

(65) Prior Publication Data
US 2006/0113813 A1 Jun. 1, 2006

Related U.S. Application Data

(60) Provisional application No. 60/631,391, filed on Nov. 29, 2004.

(51) Int. Cl.
B60P 3/34 (2006.01)
(52) U.S. Cl. .................... 296/26.01; 296/26.08; 296/61
(58) Field of Classification Search ............. 296/26.01, 296/26.08, 61, 159, 161, 162
See application file for complete search history.

(56) References Cited

U.S. PATENT DOCUMENTS

| 3,923,335 | A | | 12/1975 | Erickson | |
|---|---|---|---|---|---|
| 3,968,809 | A | * | 7/1976 | Beavers | 296/161 |
| 4,109,954 | A | * | 8/1978 | Wall | 296/161 |
| 4,133,577 | A | | 1/1979 | Pilant | |
| 4,192,543 | A | | 3/1980 | Crawford | |
| 4,420,182 | A | | 12/1983 | Kaneshiro | |
| 4,487,553 | A | * | 12/1984 | Nagata | 417/171 |
| 4,754,998 | A | | 7/1988 | LeJuerrne | |
| 5,419,607 | A | * | 5/1995 | Oliveira | 296/159 |
| 5,462,330 | A | | 10/1995 | Brown | |
| 5,992,920 | A | | 11/1999 | Bailey et al. | |
| 6,135,539 | A | | 10/2000 | Bailey et al. | |
| 6,179,368 | B1 | * | 1/2001 | Karlsson | 296/161 |
| 6,283,537 | B1 | | 9/2001 | DeVore, III | |
| 6,481,784 | B2 | | 11/2002 | Cargill | |
| 6,561,570 | B2 | | 5/2003 | Gehan et al. | |
| 6,669,269 | B1 | | 12/2003 | Tan-Ngoc | |
| 6,722,726 | B1 | | 4/2004 | Parmer | |
| 6,802,555 | B2 | | 10/2004 | Yoder et al. | |
| RE38,766 | E | * | 8/2005 | Karlsson | 296/161 |
| 6,969,103 | B2 | * | 11/2005 | Pape et al. | 296/25 |
| 6,971,707 | B1 | * | 12/2005 | Mullan | 296/172 |
| 7,100,625 | B2 | * | 9/2006 | Valles | 296/159 |
| 2003/0173758 | A1 | | 9/2003 | Badger et al. | |

OTHER PUBLICATIONS

Carefree of Colorado, "Carefree Outback Awning", www.carefreefcolorado.com, 2 pages.

* cited by examiner

Primary Examiner—Lori L Lyjak
(74) Attorney, Agent, or Firm—Pearne & Gordon LLP

(57) ABSTRACT

A collapsible enclosure is appended to a vehicle, such as a cargo type trailer, for example, for the purpose of providing living space in association with the vehicle. The vehicle includes a ramp that offers ingress to and egress from the interior of the vehicle through an access opening in the body of the vehicle for loading and unloading the vehicle, and the collapsible enclosure is appended to the vehicle at the access door opening and the ramp. Access to the interior of the collapsible enclosure can be had from the interior of the vehicle through the access opening. The size of the collapsible enclosure is adjustable so that the enclosure may be used with vehicles having ramps and access openings of different sizes. The ramp, which can be supported in a position substantially parallel to the surface on which the vehicle rests, serves as the floor of the additional living space that is created within the collapsible enclosure.

33 Claims, 4 Drawing Sheets

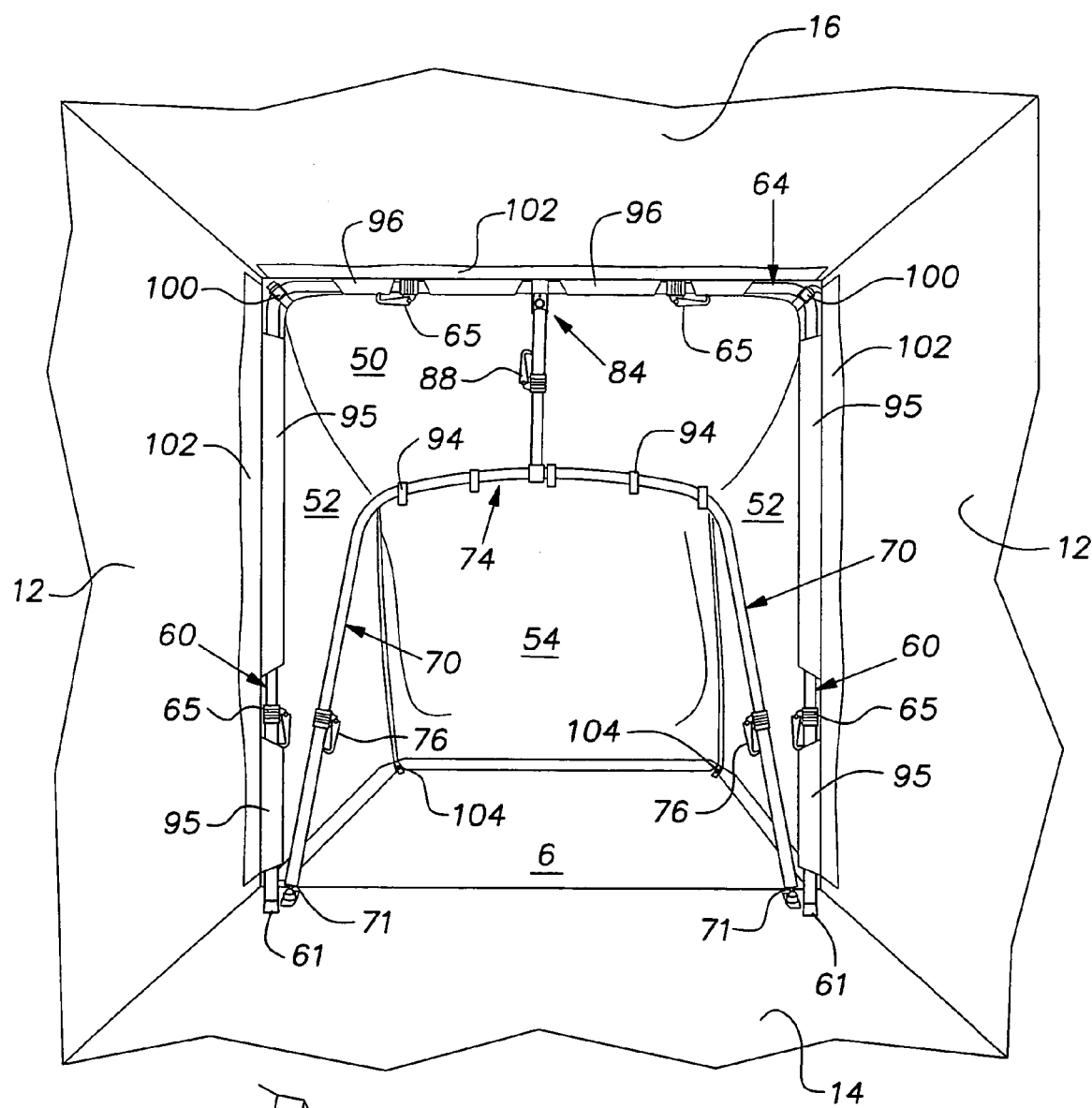
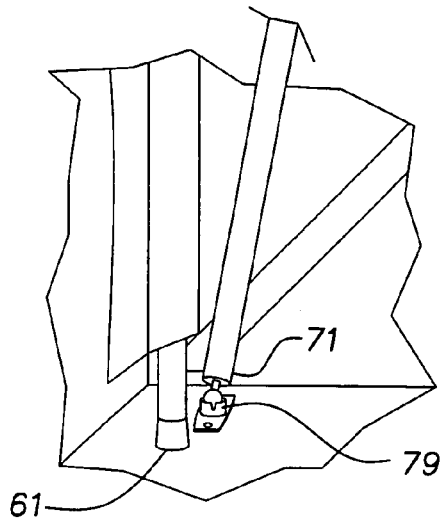
FIG. 8
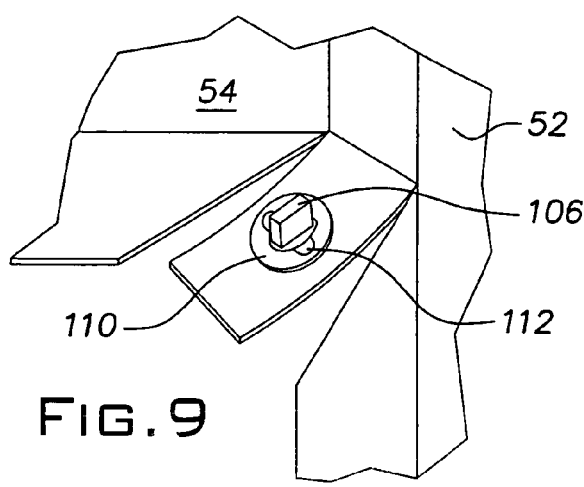
FIG. 9
FIG. 7

VEHICLE RAMP ROOM

BACKGROUND OF THE INVENTION

This invention generally concerns collapsible enclosures that can be appended to vehicles to provide additional living space and, in particular, the invention relates to collapsible enclosures that can be appended to a vehicle and that use, as a floor, a ramp that is adapted to provides egress from and ingress to the interior of the vehicle.

Vehicles of various types can be constructed so that living space can be created in association with the vehicle when the vehicle is at rest. In some cases the living space is created by expanding the living space that is already available in the vehicle. The living space can be created in a number of ways. In certain instances, for example, the living space is created by raising a collapsible structure that is appended to the vehicle.

Additionally, certain over-the-road vehicles are provided with ramps for the loading and unloading of equipment and the like and other smaller vehicles, such as motor bikes and off-road vehicles. Whether these over-the-road vehicles comprise recreational vehicles, for example, or vehicles designed specifically to carry cargo of one type or another, an area within the vehicle is provided where the equipment and the like, and the other smaller vehicles, can be stored. An access door or opening is provided in the body of the over-the-road vehicle through which the equipment or other smaller vehicles can be removed from and returned to the vehicle. In order to facilitate the loading and unloading of the equipment and smaller vehicles, a ramp can be provided between the access door or opening in the body of the vehicle and the surface on which the vehicle rests. Typically, the access door is located at the rear of the vehicle, although in some instances the access door can be located at the sides or front of the vehicle.

SUMMARY OF THE INVENTION

The present invention provides additional living space for a vehicle that includes a ramp that offers ingress to and egress from the interior of the vehicle from the surface on which the vehicle rests through an access opening in the body of the vehicle. A collapsible enclosure is appended to the vehicle at the access door opening and at the ramp. The ramp serves as the floor for the additional living space that is created within the collapsible enclosure. The size of the collapsible enclosure is adjustable so that the enclosure may be used with vehicles having ramps and access openings of different sizes.

According to one aspect, the invention comprises a collapsible enclosure that is adapted to be appended to a vehicle body at an access opening in the vehicle body and at a ramp. The ramp is adapted to provide ingress to and egress from the interior of the vehicle body from and to the surface on which the vehicle body rests through the access opening when the collapsible enclosure is not appended to the vehicle body. The ramp is further adapted to be supported above the surface on which the vehicle body rests and provide a floor for the collapsible enclosure when the collapsible enclosure is installed at the ramp. The collapsible enclosure has a rearward end that is adapted to be located at the access opening in the vehicle body and a forward end that is adapted to located away from the access opening in the vehicle body. Both the height of the rearward end, above the ramp, and the width of the rearward end, across the width of the access opening, of the collapsible enclosure are adjustable, whereby the rearward end of the collapsible enclosure may be adjusted to conform to the height and width of the access opening. The interior of the collapsible structure is adapted to be open to the interior of the vehicle through the access opening in the body of the vehicle. In a particular aspect, the collapsible enclosure has an outer surface that comprises an upper portion that is adapted to be located above the ramp and close off the top of the collapsible enclosure, side portions that are adapted to extend from opposite sides of the upper portion downwardly toward the ramp so as to close off the sides of the collapsible enclosure and a front portion that is adapted to extend from the upper portion downwardly toward the ramp and between the side portions at the forward end of the collapsible enclosure so as to close off the front of the collapsible enclosure.

According to a further aspect, the outer surface of the collapsible enclosure comprises a flexible material and a substantially rigid framework supports the outer surface of the collapsible enclosure from the interior of the collapsible enclosure. The substantially rigid framework can comprise a forward framework component that supports the outer surface of the collapsible enclosure at the forward end of the collapsible enclosure and a rearward framework component that supports the outer surface of the collapsible enclosure at the rearward end of the collapsible enclosure. Additionally, the substantially rigid framework can include a central framework component that extends between the forward and rearward ends of the collapsible enclosure. The central framework component can be secured at a first end to the mid-portion of the forward framework component and secured at a second end to the mid-point of the rearward framework component and thereby support the upper portion of the outer surface of the collapsible enclosure. Further, the length of the central framework component, between the forward framework component and the rearward framework component, can be adjustable.

According to still another aspect, the height of the side portions of the outer surface of the collapsible enclosure between the ramp and the upper portion of the outer surface of the collapsible enclosure can be adjustable so as to accommodate the adjustment of the height of the rearward framework component. Also, the width of the upper portion of the outer surface of the collapsible enclosure across the access opening can be adjustable so as to accommodate the adjustment of the width of the rearward framework component.

According to yet a further aspect, the rearward framework component can comprise a pair of vertical legs that are joined at one of their respective ends by a horizontal leg. The vertical legs are attached to respective side portions of the outer surface of the collapsible enclosure, and the horizontal leg is attached to the upper portion of the outer surface of the collapsible enclosure at the rearward end of the collapsible enclosure.

According to still a further aspect, the other of the respective ends of the vertical legs of the rearward framework component are adapted to rest on the floor of the interior of the vehicle body, the side portions of the outer surface of the collapsible enclosure are adapted to be attached to respective sides of the interior of the vehicle body and the upper portion of the outer surface of the collapsible enclosure is adapted to be attached to the interior of the roof of the vehicle body.

According to yet another aspect, the forward framework component can comprise a pair of legs that are joined at one of their respective ends by a cross-member that is arched toward the upper portion of the outer surface of the collapsible enclosure. The other of the respective ends of the pair of legs of the forward framework component are adapted to be attached to the interior of the floor of the vehicle body adjacent respective sides of the interior of the vehicle body. The length of the pair of legs of the forward framework component is adjustable, and the arched cross-member is attached to the front end of the outer surface of the collapsible enclosure.

According to a further aspect, the upper portion of the outer surface of the collapsible enclosure, at each of the two locations where the side portions of the outer surface of the collapsible enclosure extend from the upper portion of the outer surface of the collapsible enclosure at the rearward end of the collapsible enclosure, is fastened to the rearward framework component at the respective locations where the horizontal leg of the rearward framework component is joined to the vertical legs of the rearward framework component.

According to another aspect, the front portion of the outer surface of the collapsible enclosure is joined to the side portions of the outer surface of the collapsible structure to form opposite corners at the front end of the collapsible enclosure adjacent the ramp, and the opposite corners are adapted to be attached to the ramp of the vehicle body.

According to still another aspect, the invention concerns an assembly that comprises a vehicle body, an access opening in the vehicle body, a ramp located at the access opening in the vehicle body and a collapsible enclosure as described above. In a particular aspect, the access opening in the vehicle body can be located at the rear of the vehicle.

BRIEF DESCRIPTION OF THE DRAWINGS

FIG. 7 is a perspective view of the interior of the rear section of the vehicle body and the interior of the collapsible enclosure as seen from the interior of the vehicle body.

FIG. 8 is a fragmentary perspective view that shows in a slightly enlarged aspect compared to FIG. 7 the manner in which the rearward and forward components of the framework are supported at the interior of the floor of the vehicle body.

FIG. 9 is a fragmentary perspective view that shows in a slightly enlarged aspect compared to FIG. 7 the manner in which the forward end of the collapsible structure is attached to the vehicle ramp.

DESCRIPTION OF AN EMBODIMENT OF THE INVENTION

Figure 1:
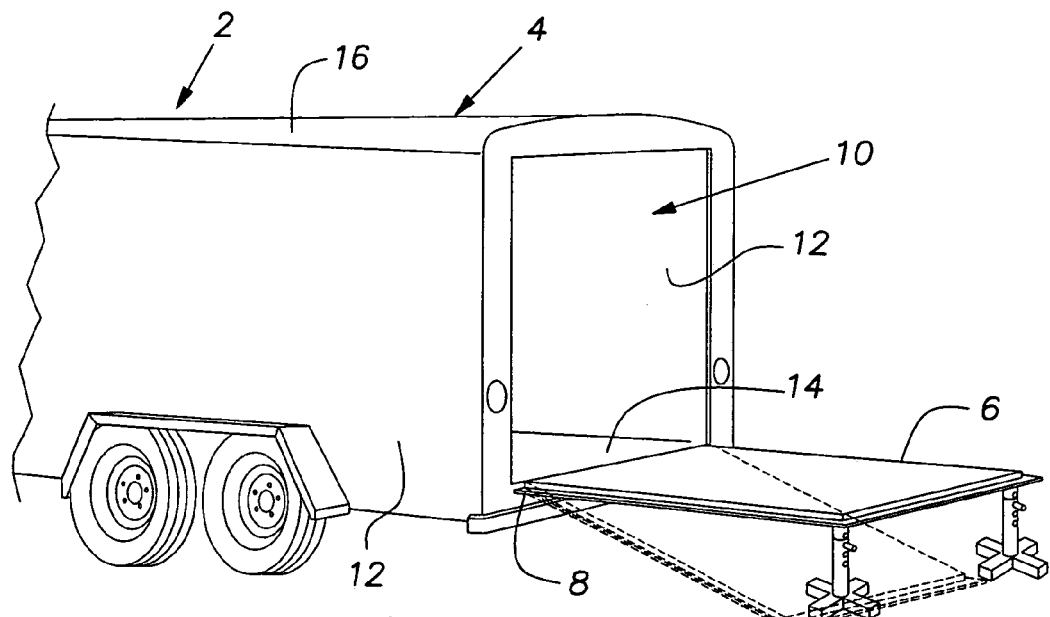
FIG. 1 is a perspective view of the rear section of a vehicle having a ramp for loading and unloading cargo into and from the interior of the vehicle through an access opening that can be closed by the ramp. The ramp is shown in phantom lines to illustrate its attitude when cargo is being loaded and unloaded and in solid lines to show its attitude when it is in a position to support the collapsible enclosure of the invention.

The following is a description of an embodiment of the invention as shown in the drawings. Although the description includes certain references to modifications and alternatives that may be made to that embodiment, it will be understood that the description is not intended to comprehensively include all such modifications and alternatives. In particular, the description is not intended to include all modifications and alternatives that would occur to those having ordinary skill in the art.

Referring first to FIG. 1, there is shown a vehicle, indicated generally at 2 comprising a cargo type trailer that is used to carry cargo of various kinds including, for example equipment and vehicles such as motor bikes and the like. The front of the trailer, which is not shown, is hitched to a truck or similar motive means, also not shown, and towed over the roadways. The invention, however, is not limited to cargo trailers and is also applicable, for example, to recreational vehicles that have an area at the rear of the interior of the recreational vehicle where cargo of one sort or another can be stored.

The vehicle 2 includes a vehicle body 4 and a ramp 6 that is pivotally connected to the rear of the vehicle at 8 and is adapted to provide ingress to and egress from the interior of the vehicle from and to the surface on which the vehicle rests when the ramp is lowered to that surface as shown by the phantom lines in FIG. 1. The loading and unloading of the vehicle takes place through the access opening 10 in the rear of the vehicle body 4 that is created when the ramp is pivotally lowered from a position where it closes off the access opening. When the vehicle is traversing the roadways, or when it simply is desired to close the access opening, the ramp is pivotally raised to a vertical position and secured in a manner familiar to those skilled in the art. The vehicle body includes sides 12, a floor 14 and a roof 16 as shown in both FIG. 1 and FIG. 7.

Figure 2:
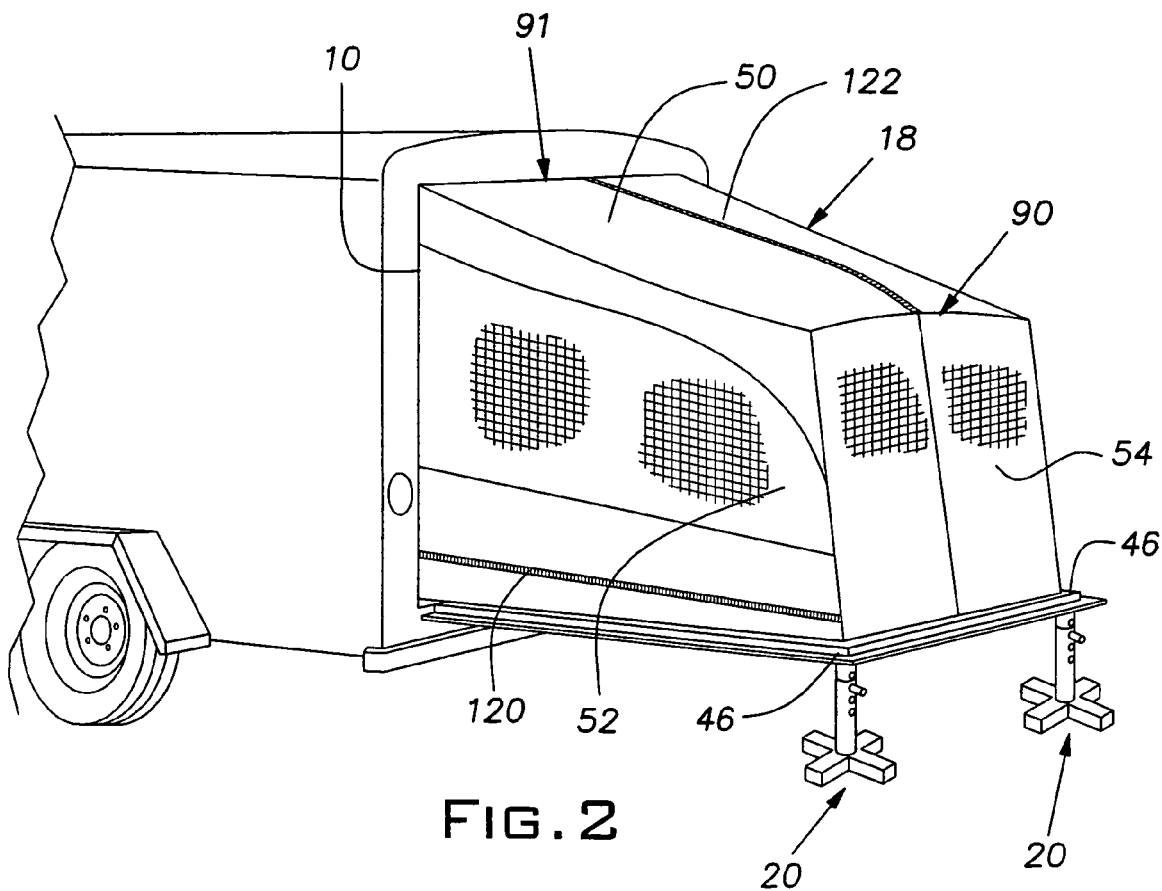
FIG. 2 is a perspective view that is similar to FIG. 1 after the collapsible enclosure has been installed at the access opening of the vehicle body and the vehicle ramp.

For the purpose of providing living space in association with the vehicle 2, the ramp 6 is supported in a position that is substantially horizontal and parallel to the surface on which the vehicle rests as shown in FIGS. 1 and 2. With the ramp 6 in that substantially horizontal position, a collapsible enclosure, indicated generally at 18 in FIG. 2 is appended at the access opening 10 in the vehicle body 4 and at the ramp 6, whereby the ramp comprises a floor for the collapsible enclosure. Thus, there is provided an assembly for living space that comprises the vehicle body 4, the access opening 10 in the vehicle body, the ramp 6 and the collapsible enclosure 18. As will become apparent from the description that follows, the interior of the collapsible structure is accessible from the interior of the vehicle.

Although in the foregoing description the access opening 10 and ramp 6 are located at the rear of the vehicle body 4, they can be located elsewhere such as, for example, at the side of the vehicle body together with the collapsible enclosure 18.

Figure 3:
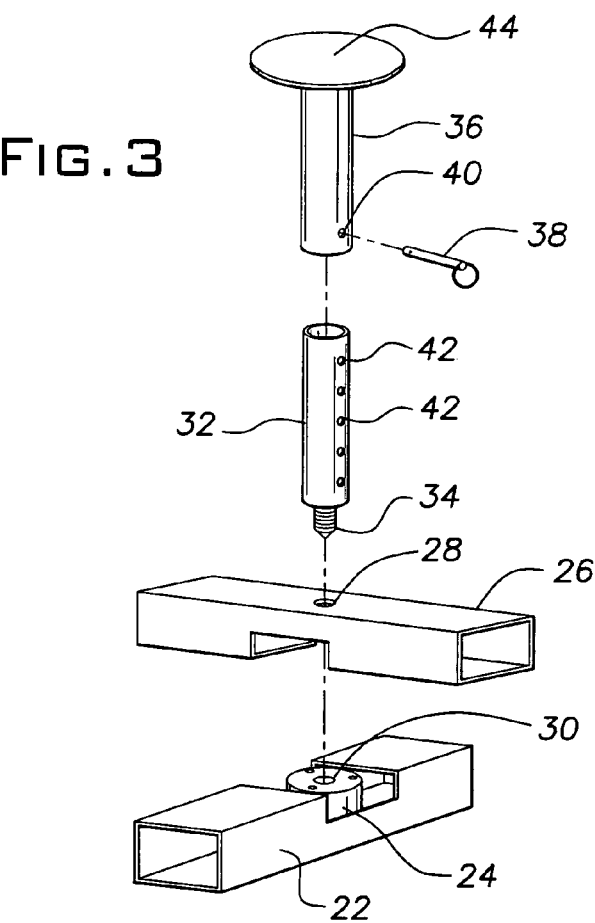
FIG. 3 is an exploded perspective view of the supports that can be employed to support the vehicle ramp and the collapsible enclosure.

Any suitable structural support can be used to support the ramp 6 in the horizontal position shown in FIGS. 1 and 2. An example of a type of support 20 that can be employed is illustrated in FIG. 3. As shown there, the support comprises a first channel member 22 having a recess in which is located a nylon insert 24 that is fastened to the first channel member. A second channel member 26 is arranged perpendicularly to the first channel member 22, and the second channel member 26 is also provided with a recess that overlies the recess and the nylon insert 24 in the first channel member. An opening 28 is provided in the second channel member in alignment with a threaded bore 30 in the nylon insert 24. A lower tubular stand pole 32 having a threaded stud bolt 34 attached to one end of the lower stand pole secures the first and second channel members together. This is accomplished by passing the stud bolt 34 through the opening 28 in the second channel member 26 and screwing the stud bolt into the threaded bore 30. A top tubular stand pole 36 having an inside diameter slightly greater than the outside diameter of the lower tubular stand pole 32 is placed down over the lower tubular stand pole and is held in place by a ball pin 38 that is inserted into the opening 40 in the top tubular stand pole and through a matching diametrically opposed pair of holes in the lower tubular stand pole. A series of holes 42 are provided in the lower tubular stand pole 32 so that the height of the support can be adjusted to a position allowing the ramp 6 to be supported in a substantially horizontal position with the resting plate 44, secured to and located at the top of the top tubular stand pole 36, engaging the underside of the ramp. Preferably, the supports 20 are placed into position under the free corners 46 of the ramp as shown in FIG. 2.

Turning now to a description of the collapsible enclosure 18, it is to be noted that collapsible enclosure has an outer surface of a flexible material and has a forward end 90 and a rearward end 91 as shown in FIG. 2. The outer surface comprises an upper portion 50 that is adapted to be located above the ramp and close off the top of the collapsible enclosure, side portions 52 that are adapted to extend from opposite sides of the upper portion 50 downwardly toward the ramp 6 so as to close off the sides of the collapsible enclosure and a front portion 54 that is adapted to extend from the upper portion 18 of the collapsible enclosure downwardly toward the ramp 6 and between the side portions 52 away from the access opening 10 in the vehicle body 4 and at the forward end 90 of the collapsible enclosure so as to close off the front of the collapsible enclosure.

The collapsible enclosure also includes a substantially rigid framework that supports the outer surface of flexible material from the interior of the collapsible enclosure in a manner to be described. The components of this framework are shown in FIGS. 4, 5 and 6 and FIG. 7 illustrates the assembled framework installed so as to support the outer surface of flexible material of the collapsible enclosure.

Figure 4:
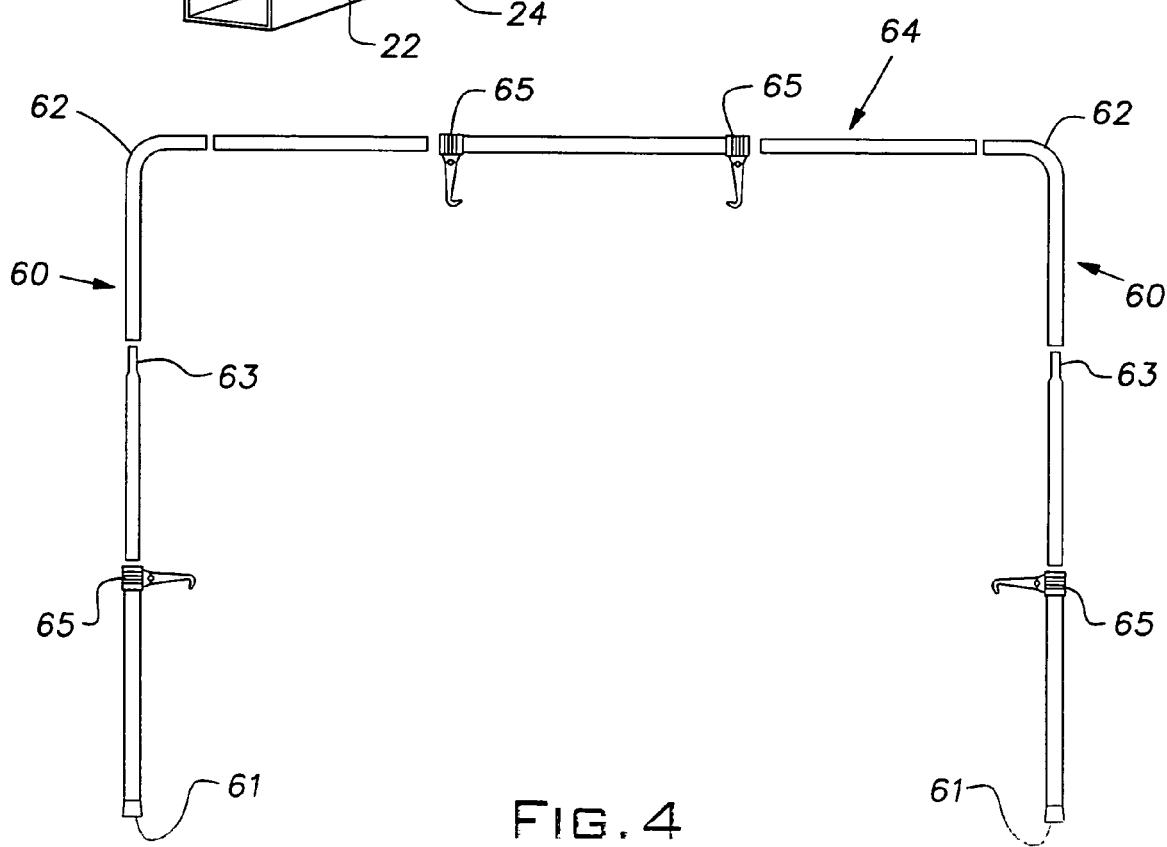
FIG. 4 is an exploded elevational view of the rearward component of the framework employed to support the outer surface of the collapsible enclosure.

Referring first to FIG. 4, a rearward framework component of the substantially rigid framework is shown. The rearward framework component comprises a pair of vertical legs 60 that are joined at one of the respective ends 62 of the vertical legs by a horizontal leg 64. The pair of vertical legs 60 and the horizontal leg 64 are constructed of a plurality of tubular segments that are joined together either by inserting a necked-down section 63 of a tubular segment into an adjacent tubular segment that has not been necked-down or by a lock lever mechanism 65 of a type that is familiar to those having ordinary skill in the art. The purpose of the lock lever mechanism is to allow one of the tubular segments held by the mechanism to be inserted within an adjacent tubular segment to any desired extent whereupon the segments are locked in place by the lock lever mechanism. As a result, the height of the rearward framework component above the ramp 6 is adjustable and the width of the rearward framework component across the width of the access opening 10 in the vehicle body is adjustable.

Figure 5:
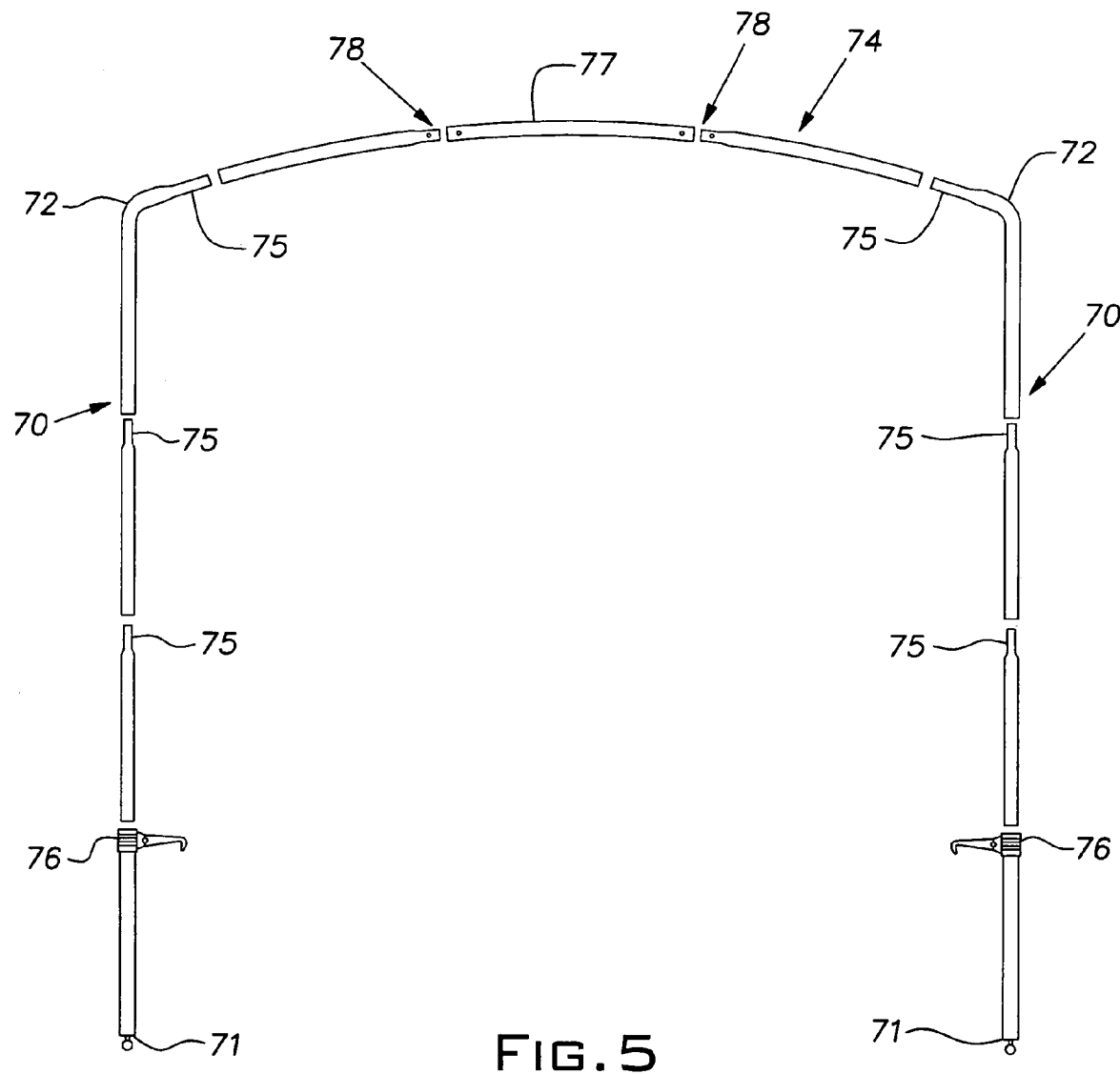
FIG. 5 is an exploded elevational view of the forward component of the framework employed to support the outer surface of the collapsible enclosure.

Referring now to FIG. 5, the forward framework component of the substantially rigid framework is shown. The forward framework component comprises a pair of legs 70 that are joined at one of the respective ends 72 of the pair of legs by an arched cross member 74 that, when installed, is arched towards the upper portion 50 of the outer surface of the collapsible enclosure. As with the rearward framework component, the forward framework component is constructed of a plurality of tubular segments that are joined together by means of necked-down sections 75 on the tubular segments or a lock lever mechanism 76. However, in the case of the forward framework component, only the pair of legs 70 are provided with lock lever mechanisms so that only the length of the legs 70 in the embodiment of the invention shown in the drawings is adjustable. The arched cross member 74 in the embodiment of the invention shown in the drawings is of a fixed length and push-pin connections 76 are provided for securing the middle tubular segment 77 of the cross member to the two adjacent tubular segments.

Figure 6:
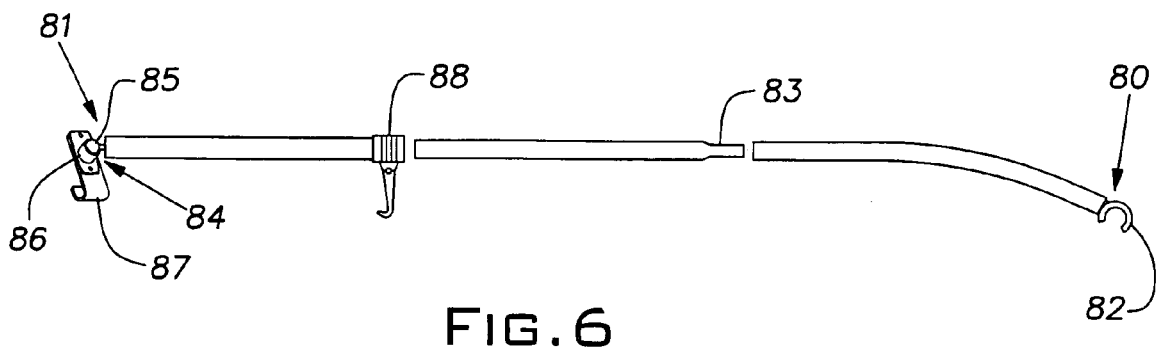
FIG. 6 is a longitudinal side view of a component of the framework employed to support the upper portion of the outer surface of the collapsible enclosure.

The substantially rigid framework supporting the outer surface of flexible material also includes a central framework component, as shown in FIG. 6, that is secured at a first end 80 to the mid-portion of the forward framework component and is attached at a second end 84 to the mid-point of the rearward framework component. More specifically, in the embodiment of the invention shown in the drawings, the first end 80 of the central framework component is attached to the mid-point of the arched cross member 74 of the forward framework component by means of a "C" clip 82 at the first end 80 of the central framework component. And the second end 81 of the central framework component is attached to the mid-point of the horizontal leg 64 of the rearward framework component by means of a ball and socket connection 84 with the ball 85 of the connection being attached to the end of the central framework component and the socket 86 of the connection being attached to a "J" clip 87 that is clipped to the mid-point of the horizontal leg 64 of the rearward framework component. The central framework component is constructed of a plurality of tubular segments that are secured to one another by means of a necked-down section 83 on the segments or by means of a lock lever mechanism 88. The lock lever mechanism 88 allows for the length of the central framework component to be adjustable between the forward framework component and the rearward framework component. Additionally, the portion of central framework component toward the first end 80 is arched in a direction such that when the central framework component is installed, the upper portion 50 of the outer surface of the collapsible structure will slope downwardly toward front end 90 as can be seen in FIG. 2.

Turning now to a more detailed description of the manner in which the substantially rigid framework supports the outer surface of the collapsible enclosure, it is to be first noted that, as shown in FIG. 2 and previously noted, the collapsible enclosure, in addition to including a forward end 90 where the front portion 54 of the outer surface of the collapsible enclosure extends downwardly from the upper portion 50 of the outer surface of the collapsible enclosure, includes a rearward end 91 that is located at the access opening 10 in the vehicle body 4.

As shown in FIG. 7, the forward framework component extends substantially laterally of the forward end 90 of the collapsible enclosure and supports the outer surface of the collapsible enclosure at the forward end of the collapsible enclosure. The rearward framework component extends substantially laterally of the rearward end 91 of the collapsible enclosure and supports the outer surface of the collapsible enclosure at the rearward end of the collapsible enclosure. The central framework component extends substantially transversely of the forward and rearward ends of the collapsible enclosure and supports the upper portion 50 of the outer surface of the collapsible enclosure along the mid-line of the upper portion of the outer surface of the collapsible enclosure.

The details of the manner in which the forward framework component supports the outer surface of the collapsible enclosure at the forward end of the collapsible enclosure may be described as follows with reference to FIGS. 7, 8 and 9. As previously noted, the forward framework component comprises a pair of legs that are joined at one of their respective ends by the arched cross-member 74. The other of the respective ends 71 of the pair of legs is attached to the interior of the floor 14 of the vehicle body 4 adjacent a respective side 12 of the interior of the vehicle body. In the embodiment of the invention shown in the drawings, the attachment is completed by means of a ball and socket connection with the ball of the connection being fixed to the other of the respective ends 71 of the pair of legs and the socket 79 of the connection being fixed to the interior of the floor 14 of the vehicle body as shown in FIG. 8. Each of the sockets 79 includes a cut-out portion that is at the front of the socket facing the ramp 6 so that the leg attached to the socket can pivot downwardly in the socket toward the forward end 90 of the outer surface of the collapsible enclosure. The arched cross-member 74 of the forward framework component is attached to the forward end of the outer surface of the collapsible enclosure by a plurality of attaching devices 94 such as, for example, straps having complementary hooks and loops that fasten to one another. The fact that the legs 70 of the forward framework component are adjustable allows the cross-member 74 to be thrust forwardly so that the forward framework component will keep the forward end 90 of the outer surface of the collapsible enclosure taut.

The details of the manner in which the rearward framework component supports the outer surface of the collapsible enclosure at the rearward end of the collapsible enclosure also are shown in FIG. 7 and may be described as follows. As previously noted, the rearward framework component comprises a pair of vertical legs 60 that are joined at one of their respective ends by a horizontal leg 64. The vertical legs 60 are attached to respective side portions 52 of the outer surface of the collapsible enclosure and the horizontal leg 64 is attached to the upper portion of the outer surface of the collapsible enclosure. More specifically, in the embodiment of the invention shown in the drawings, a plurality of sleeve segments 95 are integrated with the side portions 52 of the outer surface of the collapsible enclosure at essentially the rear margin of the side portions. A respective one of the vertical legs 60 is inserted into the sleeve segments 95 on each of the side portions 52. The sleeve segments on each side portion are spaced so that when the vertical legs are in place within the sleeve segments, the lock lever 65 on each vertical leg will be located in a gap between two adjacent sleeve segments.

Similarly with the horizontal leg 64, and also as shown in FIG. 7, a plurality of sleeve segments 96 are incorporated into the upper portion 50 of the outer surface of the collapsible enclosure at essentially the rear margin of the upper portion. The horizontal leg 64 is inserted into the sleeve segments 96 which are spaced on the upper portion 50 so that when the horizontal leg is in place within the sleeve segments, the lock lever 65 on the horizontal leg 64 will be located in the gap between two adjacent sleeve segments.

For the purpose of supporting the rearward end 91 of the collapsible enclosure when the collapsible enclosure is fully deployed, the free ends 61 of the vertical legs 60 of the rearward frame component are placed on the interior of the floor 14 of the vehicle body 4 as shown in FIGS. 7 and 8. In addition, through appropriate manipulation of the lock levers 65 and the associated tubular segments, the vertical legs 60 are extended or contracted, as required, so that the horizontal leg 64, within the sleeve segments 96, can engage the interior of the roof 16 of the vehicle body 4. Similarly, through appropriate manipulation of the lock levers 65 on the horizontal leg 64 and the associated tubular segments, the horizontal leg is extended or contracted, as required, so that the vertical legs 60, within the sleeve segments 95 can engage the interior of respective sides 12 of the vehicle body 4.

Additionally, as shown in FIG. 7, the upper portion 50 of the outer surface of the collapsible enclosure, at each of the two locations where the side portions 52 of the outer surface of the collapsible structure extend from the upper portion 50 adjacent the rearward end 91, are fastened to the rearward framework component at substantially the respective locations where the horizontal leg 64 of the rearward framework component is joined to the vertical legs 60 of the rearward framework component. Thus, in the embodiment shown in FIG. 7, adjustable belts 100 are sewn to the outer surface of the collapsible enclosure essentially where the upper portion 50 and the side portions 52 join at the rear margins of the upper portion and the side portions. The adjustable belts are secured to the rearward framework component at the location 62 where the horizontal leg 64 is joined to the vertical legs 60. The securing of the upper portion 50 of the outer enclosure of the collapsible enclosure to the rearward framework component in this manner prevents the upper portion from sagging at the rearward end 91 and collecting water and/or debris.

The ability of the rearward framework component to be adjusted vertically and horizontally, so that the vertical legs and the horizontal leg of the rearward framework component can be placed into engagement with the interior of the vehicle body, as described above, provides stability to the rearward end of the collapsible enclosure. In order to further insure that the rearward end of the collapsible enclosure is securely in place, the side portions 52 of the outer surface of the collapsible enclosure are attached to respective sides 12 of the interior of the vehicle body and the upper portion 50 of the outer surface of the collapsible enclosure is attached to the interior of the roof 16 of the vehicle body 4. To accomplish this, in the embodiment of the invention shown in the drawing, flaps 102 are incorporated at the rear margins of the upper portion 50 and the side portions 52 of the outer surface of the collapsible enclosure. These flaps extend inwardly of the interior of the vehicle body 4 beyond the rearward frame component. The sides of the flaps 102 facing the sides and roof of the vehicle body are provided with one of the elements of a hook and loop fastening arrangement, and the other element of the fastening arrangement is attached to the interior sides and roof of the vehicle body. The flaps are attached to the interior sides and roof of the vehicle body by means of this fastening arrangement.

The embodiment of the invention shown in the drawings also provides for the securement of the front end 90 of the collapsible enclosure to the ramp 6. In particular, the front portion 50 of the outer surface of the collapsible enclosure is joined to the side portions 52 of the outer surface of the collapsible enclosure to form corners 104 at the bottom margin of the front portion 50 and the bottom margins of the side portions 52. These corners are attached to respective corners 46 at the free end of the ramp 6. In the embodiment of the invention shown in the drawings, a grommet 110 with an oval opening 112 is incorporated into the outer surface at the corners 104. Complementary turn button fasteners 106 are installed in the ramp. The turn button fasteners have a rotatable button, one dimension of which will pass through the major axis of the oval opening in the grommet but not through the minor axis of the oval opening. To secure the corners 104 to the ramp 6, the rotatable button on the turn button fastener is rotated to a position to allow the grommet to pass over the rotatable button and the rotatable button is then rotated to a position where the grommet cannot lift off the turn button fastener.

The outer surface of the collapsible enclosure can be further secured to the ramp 6 by the use of elastic cords that are threaded through sleeves, not shown, that are incorporated into the bottom margin of the outer surface where it is in contact with the ramp. The ends of the elastic cords are provided with hooks that are hooked to the edges of the ramp.

It will be understood that the ability of the vertical legs 60 and horizontal leg 64 of the rearward framework component to be lengthened and shortened can be fully realized only if the outer surface of the collapsible enclosure can accommodate such lengthening and shortening. Accordingly, in the embodiment of the invention shown in the drawings, the side portions 52 of the outer surface of the collapsible enclosure are adjustable so as to accommodate the adjustment of the height of the rearward framework component. In addition, the upper portion 50 of the outer surface of the collapsible enclosure is adjustable so as to accommodate the adjustment of the width of the rearward framework component. More specifically, in the embodiment of the invention shown in the drawings, an excess of the outer surface of the collapsible enclosure in the form of a V-shaped pleat or gusset is provided in both side portions 52 and in the upper portion 50 of the outer surface of the collapsible enclosure. Thus, referring to FIG. 2, the V-shaped gusset on each side portion 52 is confined by a zipper 120 that extends downwardly at an angle from the rearward end 91 to the forward end 90 of each side portion. When it is desired to elevate the rearward end of the enclosure to an extent that cannot be accommodated by the side portion 52, the zipper 120 is unzipped and the V-shaped gusset can expand as required. The gusset has a V shape and is wider at the rearward end 91 of the enclosure than at the forward end 90 of the enclosure because it is essentially only the height of the enclosure at the rearward end 91 that is adjustable in the embodiment of the invention shown in the drawings.

A similar V-shaped gusset is provided along the mid-line of the upper portion 50 of the outer surface of the collapsible enclosure. Referring again to FIG. 2, it is there shown that the gusset is confined by the zipper 122 that extends along the mid-line of the upper portion 50 between the forward end 90 and the rearward end 91 of the collapsible enclosure. When it is desired to widen the rearward end 91 of the enclosure to an extent that cannot be accommodated by the upper portion 50, the zipper 122 is unzipped and the V-shaped gusset can expand as required. The gusset has a V shape and is wider at the rearward end 91 of the enclosure than at the forward end 90 of the enclosure because it is essentially only the width of the enclosure at the rearward end 91 of the enclosure that is adjustable in the embodiment of the invention shown in the drawings.

Although not shown in the drawings, pockets can be provided on the interior of the side portions 52 and/or front portion 54 of the collapsible enclosure for storing items. Additionally, the side portions 52 and/or the front portion 54 of the collapsible enclosure can have sections fabricated of a mesh-like material for air circulation. Covers or awnings can be provided over the mesh-like material within the interior of the collapsible enclosure to close-off the mesh-like material for privacy or to keep rain from entering the enclosure.

While the invention has been shown and described with reference to a particular embodiment thereof, it will be understood by those of ordinary skill in the art that various modifications may be made therein and alternatives adopted without departing from the spirit and scope of the invention as defined in the appended claims. For example, various types of fasteners and attaching means are described as being employed in the invention and no departure from the scope of the invention would be involved as a result of the use of other types of fasteners and attaching means. Thus, it is intended that the invention not be limited to the particular embodiment described herein, but that the claims be given their broadest interpretation to cover all embodiments, literal or equivalent, disclosed or not, covered thereby.

What is claimed is:

1. A collapsible enclosure adapted to be appended to a vehicle body at an access opening in the vehicle body and at a ramp, the ramp being adapted to provide ingress to and egress from the interior of the vehicle body from and to the surface on which the vehicle body rests through the access opening when the collapsible enclosure is not appended to the vehicle body and further adapted to be supported above the surface on which the vehicle body rests and provide a floor for the collapsible enclosure when the collapsible enclosure is installed at the ramp;

the collapsible enclosure having a rearward end adapted to be located at the access opening in the vehicle body and a forward end adapted to be located away from the access opening in the vehicle body, both the height of the rearward end above the ramp and the width of the rearward end across the width of the access opening being adjustable, whereby the rearward end of the collapsible enclosure may be adjusted to conform to the height and width of the access opening;

and the interior of the collapsible structure is adapted to be open to the interior of the vehicle body through the access opening in the vehicle body.

2. The collapsible enclosure of claim 1 wherein:

the collapsible enclosure has an outer surface that comprises an upper portion adapted to be located above the ramp and close off the top of the collapsible enclosure, side portions adapted to extend from opposite sides of the upper portion downwardly toward the ramp so as close off the sides of the collapsible enclosure, and a front portion that is adapted to extend from the upper portion downwardly toward the ramp and between the side portions at the forward end of the collapsible enclosure so as to close off the front of the collapsible enclosure.

3. The collapsible enclosure of claim 2 wherein:

the outer surface of the collapsible enclosure comprises a flexible material, and a substantially rigid framework supports the outer surface of the collapsible enclosure from the interior of the collapsible enclosure.

4. The collapsible enclosure of claim 3 wherein:

the substantially rigid framework comprises a forward framework component that supports the outer surface of the collapsible enclosure at the forward end of the collapsible enclosure and a rearward framework component that supports the outer surface of the collapsible enclosure at the rearward end of the collapsible enclosure.

5. The collapsible enclosure of claim 4 wherein:

the substantially rigid framework includes a central framework component that extends between the forward and rearward ends of the collapsible enclosure, is secured at a first end to the mid-portion of the forward framework component and is secured at a second end to the mid-point of the rearward framework component, and supports the upper portion of the outer surface of the collapsible enclosure.

6. The collapsible enclosure of claim 5 wherein:
the length of the central framework component, between the forward framework component and rearward framework component, is adjustable.

7. The collapsible enclosure of claim 6 wherein:
the height of the side portions of the outer surface of the collapsible enclosure between the ramp and the upper portion of the outer surface of the collapsible enclosure are adjustable so as to accommodate the adjustment of the height of the rearward framework component.

8. The collapsible enclosure of claim 7 wherein:
the width of the upper portion of the outer surface of the collapsible enclosure across the access opening is adjustable so as to accommodate the adjustment of the width of the rearward framework component.

9. The collapsible enclosure of claim 8 wherein:
the rearward framework component comprises a pair of vertical legs that are joined at one of their respective ends by a horizontal leg, the vertical legs are attached to respective side portions of the outer surface of the collapsible enclosure and the horizontal leg is attached to the upper portion of the outer surface of the collapsible enclosure at the rearward end of the collapsible enclosure.

10. The collapsible enclosure of claim 9 wherein:
the other of the respective ends of the vertical legs of the rearward framework component are adapted to rest on the floor of the interior of the vehicle body;
the side portions of the outer surface of the collapsible enclosure are adapted to be attached to respective sides of the interior of the vehicle body;
and the upper portion of the outer surface of the collapsible enclosure is adapted to be attached to the interior of the roof of the vehicle body.

11. The collapsible enclosure of claim 10 wherein:
the forward framework component comprises a pair of legs that are joined at one of their respective ends by a cross-member that is arched toward the upper portion of the outer surface of the collapsible enclosure;
the other of the respective ends of the pair of legs of the forward framework component are adapted to be attached to the interior of the floor of the vehicle body adjacent respective sides of the interior of the vehicle body;
the length of the pair of legs of the forward framework component is adjustable; and
the arched cross-member is attached to the front end of the outer surface of the collapsible enclosure.

12. The assembly of claim 11 wherein:
the upper portion of the outer surface of the collapsible enclosure, at each of the two locations where the side portions of the outer surface of the collapsible enclosure extend from the upper portion of the outer surface of the collapsible enclosure at the rearward end of the collapsible enclosure, is fastened to the rearward framework component at substantially the respective locations where the horizontal leg of the rearward framework component is joined to the vertical legs of the rearward framework component.

13. The assembly of claim 12 wherein:
the front portion of the outer surface of the collapsible enclosure is joined to the side portions of the outer surface of the collapsible structure to form opposite corners at the front end of the collapsible enclosure adjacent the ramp, and the opposite corners are adapted to be attached to the ramp.

14. The collapsible enclosure of claim 1 wherein:
the outer surface of the collapsible enclosure comprises a flexible material and a substantially rigid framework supports the outer surface of collapsible enclosure from the interior of the collapsible enclosure.

15. The collapsible enclosure of claim 14 wherein:
the substantially rigid framework comprises a forward framework component that supports the outer surface of the collapsible enclosure at the forward end of the collapsible enclosure, and a rearward framework component that supports the outer surface of the collapsible enclosure at the rearward end of the collapsible enclosure.

16. The collapsible enclosure of claim 15 wherein:
the substantially rigid framework includes a central framework component that extends between the forward and rearward ends of the collapsible enclosure and is secured at a first end to the mid-portion of the forward framework component and at a second end to the mid-point of the rearward framework component.

17. An assembly comprising:
a vehicle body;
an access opening in the vehicle body;
a ramp located at the access opening in the vehicle body, the ramp being adapted to provide ingress to and egress from the interior of the vehicle body from and to the surface on which the vehicle rests through the access opening in the vehicle body and further adapted to be placed in a position substantially parallel to the surface on which the vehicle body rests; and
a collapsible enclosure appended at the access opening in the vehicle body and at the ramp when the ramp is in a position substantially parallel to the surface on which the vehicle body rests whereby the ramp comprises a floor for the collapsible enclosure, the interior of the collapsible enclosure being accessible from the interior of the vehicle body.

18. The assembly of claim 17 wherein the access opening in the vehicle body is located at the rear of the vehicle.

19. The assembly of claim 17 wherein:
the collapsible enclosure has an outer surface that comprises an upper portion above the ramp that closes off the top of the collapsible enclosure, side portions that extend from opposite sides of the upper portion downwardly toward the ramp so as close off the sides of the collapsible enclosure, and a front portion that extends from the upper portion downwardly toward the ramp and between the side portions away from the access opening in the vehicle body so as to close off the front of the collapsible enclosure.

20. The assembly of claim 19 wherein the upper portion, the side portions and the front portion of the outer surface of the collapsible enclosure comprise unitary structure.

21. The assembly of claim 19 wherein:
the outer surface of the collapsible enclosure comprises a flexible material and a substantially rigid framework supports the outer surface of collapsible enclosure from the interior of the collapsible enclosure.

22. The assembly of claim 21 wherein:
the collapsible enclosure includes a forward end where the front portion of the outer surface of the collapsible enclosure extends downwardly from the upper portion of the outer surface of the collapsible enclosure and a rearward end that is located at the access opening in the vehicle body.

23. The assembly of claim 22 wherein:

the substantially rigid framework comprises a forward framework component that supports the outer surface of the collapsible enclosure at the forward end of the collapsible enclosure, and a rearward framework component that supports the outer surface of the collapsible enclosure at the rearward end of the collapsible enclosure.

24. The assembly of claim 23 wherein:

the substantially rigid framework includes a central framework component that extends between the forward and rearward ends of the collapsible enclosure, is secured at a first end to the mid-portion of the forward framework component and is secured at a second end to the midpoint of the rearward framework component, and supports the upper portion of the outer surface of the collapsible enclosure.

25. The assembly of claim 24 wherein:

the height of the rearward framework component above the ramp and the width of the rearward framework component across the width of the access opening in the vehicle body are adjustable.

26. The assembly of claim 25 wherein:

the length of the central framework component, between the forward framework component and rearward framework component, is adjustable.

27. The assembly of claim 26 wherein:

the height of the side portions of the outer surface of the collapsible enclosure between the ramp and the upper portion of the outer surface of the collapsible enclosure are adjustable so as to accommodate the adjustment of the height of the rearward framework component.

28. The assembly of claim 27 wherein:

the width of the upper portion of the outer surface of the collapsible enclosure across the access opening is adjustable so as to accommodate the adjustment of the width of the rearward framework component.

29. The assembly of claim 28 wherein:

the rearward framework component comprises a pair of vertical legs that are joined at one of their respective ends by a horizontal leg, the vertical legs are attached to respective side portions of the outer surface of the collapsible enclosure and the horizontal leg is attached to the upper portion of the outer surface of the collapsible enclosure.

30. The assembly of claim 29 wherein:

the vehicle body includes sides, a floor and a roof;

the other of the respective ends of the vertical legs of the rearward framework component rest on the floor of the interior of the vehicle body;

the side portions of the outer surface of the collapsible enclosure are attached to respective sides of the interior of the vehicle body;

and the upper portion of the outer surface of the collapsible enclosure is attached to the interior of the roof of the vehicle body.

31. The assembly of claim 30 wherein:

the forward framework component comprises a pair of legs that are joined at one of their respective ends by a crossmember that is arched towards the upper portion of the outer surface of the collapsible enclosure;

the other of the respective ends of the pair of legs of the forward framework component is attached to the interior of the floor of the vehicle body adjacent a respective side of the interior of the vehicle body;

the length of the pair of legs of the forward framework component is adjustable; and the arched cross-member is attached to the front end of the outer surface of the collapsible enclosure.

32. The assembly of claim 31 wherein:

the upper portion of the outer surface of the collapsible enclosure, at each of the two locations where the side portions of the outer surface of the collapsible structure extend from the upper portion of the outer surface of the collapsible enclosure at the rearward end of the collapsible enclosure, is fastened to the rearward framework component at substantially the respective locations where the horizontal leg of the rearward framework component is joined to the vertical legs of the rearward framework component.

33. The assembly of claim 32 wherein:

the front portion of the outer surface of the collapsible enclosure is joined to the side portions of the outer surface of the collapsible structure to form opposite corners at the front end of the collapsible enclosure adjacent the ramp, and the opposite corners are attached to the ramp.

* * * * *